Oct. 4, 1932.   W. H. KNAPP   1,880,259
INSULATING DEVICE FOR HIGH VOLTAGE LINES
Filed Nov. 28, 1925   2 Sheets-Sheet 1
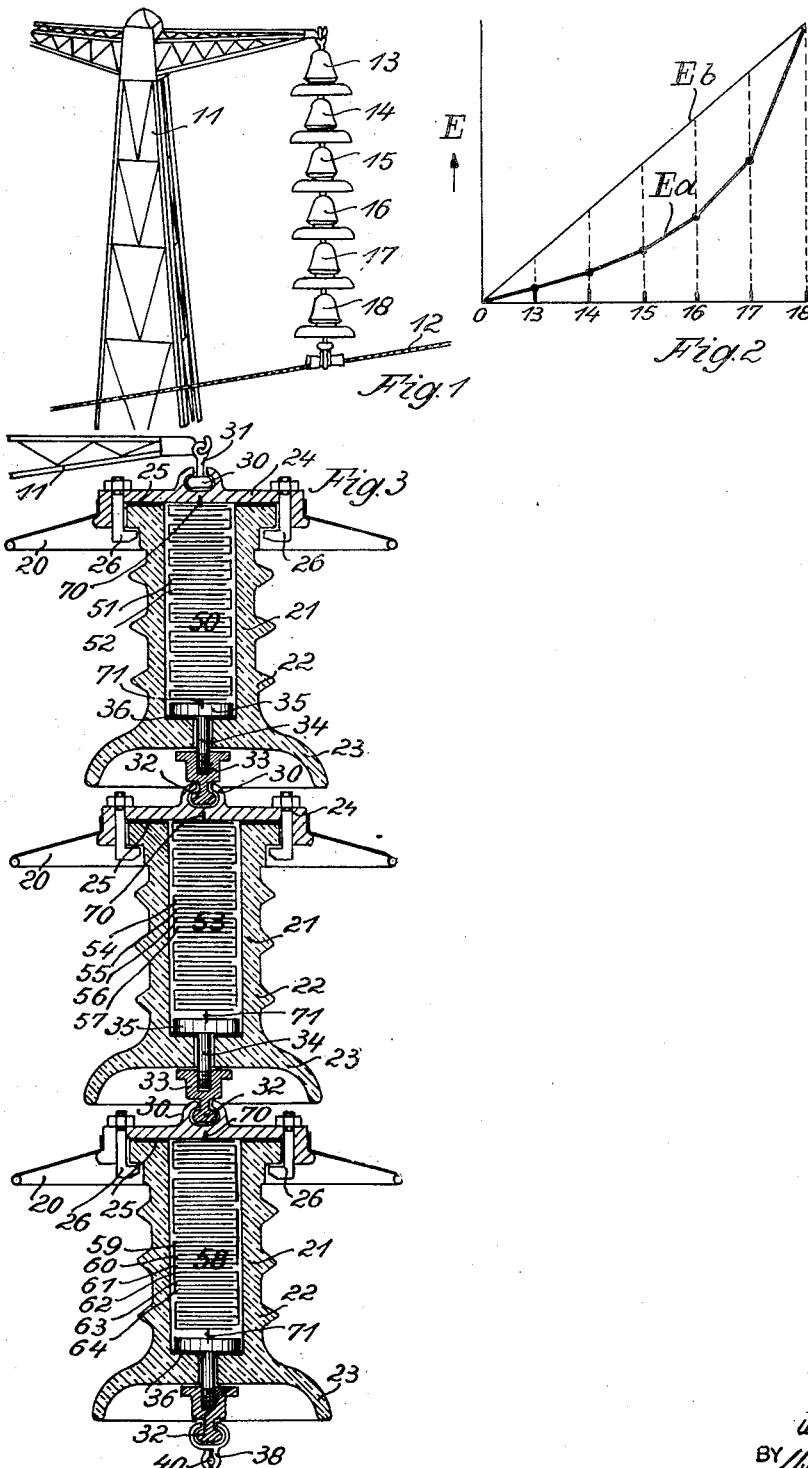

Oct. 4, 1932.   W. H. KNAPP   1,880,259
INSULATING DEVICE FOR HIGH VOLTAGE LINES
Filed Nov. 28, 1925   2 Sheets-Sheet 2
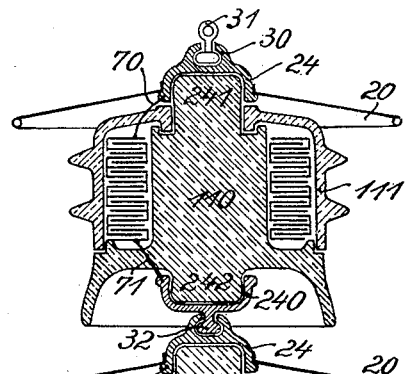
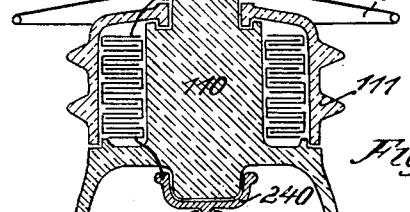
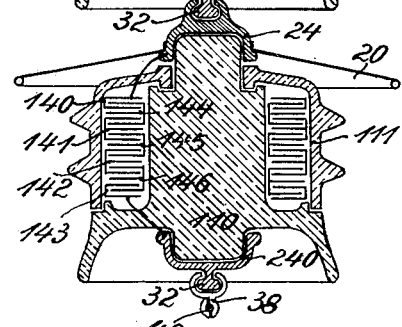
Fig. 4.
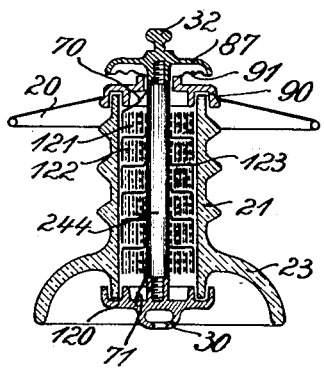
Fig. 5.
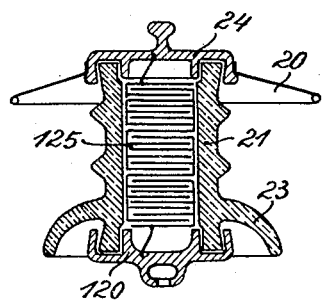
Fig. 6.
INVENTOR
Woldemar Hugo Knapp
BY
ATTORNEY Patented Oct. 4, 1932

1,880,259

UNITED STATES PATENT OFFICE

WOLDEMAR HUGO KNAPP, OF CHARLOTTENBURG, GERMANY

INSULATING DEVICE FOR HIGH VOLTAGE LINES

Application filed November 28, 1925, Serial No. 71,909, and in Germany June 2, 1925.

This invention relates to insulating devices determined to insulate electric conductors, for instance high voltage lines, from their supporting means, i. e. from the poles.

In electric systems, particularly in such for high voltage, it is very difficult to distribute the voltage stress uniformly over those insulating devices, which serve to insulate the lines of the system.

By the non-uniform distribution of the voltage over the length of the insulating devices several parts of said devices are inadmissibly highly stressed and thereby endangered.

To overcome these drawbacks in insulating devices, such as insulators or insulator-chains, improved devices are provided, by the use of which a uniform distribution of the voltage over the length of the insulating device is made possible.

According to the invention, the insulating device is provided with suitable means, which allow an even distribution of the voltage from one end to the other end of the device. Said means are electric impedances. More particularly several condensers are arranged which, for instance, in insulators or insulator-chains maintain the voltage drop uniform in the interior of the device over the whole length of the latter.

In the accompanying drawings:

Fig. 1 shows an insulator-chain of known design and

Fig. 2 shows a curve, which gives the distribution of voltage over an insulator-chain.

Figs. 3 to 6 show various modifications of my invention.

Fig. 3 shows an insulator-chain, in which an electric capacity is provided in a hollow space of the insulators.

Fig. 4 shows the arrangement of another chain of suspension insulators, in which the electric capacity is arranged in ring form around a central portion of the insulator.

Figs. 5 and 6 show further modifications of my invention.

In all figures the corresponding parts are similarly lettered.

In Fig. 1, for instance, a high voltage line 12 is suspended from a suspension tower 11, the well known suspension chain consisting of the six insulating members 13, 14, 15, 16, 17 and 18.

Investigations have shown that the voltage between the line 12 and ground is distributed between the several insulators approximately as indicated in the curve $E_a$ of Fig. 2. In the abscissæ of said diagram, the several insulators are indicated by the same letters as in the illustration of Fig. 1, in such a way that the abscissa 0 shows the suspension-point of the chain, the abscissa 13 the connection-point between the insulators 13 and 14 and the abscissa 18 the connection of the line with the insulator 18.

The ordinates of the curve $E_a$ show the amount of voltage between the respective points of the chain and its suspension-point on the cross arm.

It may be seen from the curve, that a very large part of the voltage is apportioned to the insulator 18 and only a small part to the insulator 13, as a result of which there is danger that the insulator 18 will easily be damaged by the high electric stress.

According to my invention means are provided which increase the mutual capacity of the insulator parts or of the insulators relative to the unavoidable capacity to ground of the metal parts of the insulator; the mutual capacity between the insulator parts will hereafter be referred to as inner capacity while the capacity of the metal parts to line will be called outer capacity.

According to this invention the inner capacity is increased as compared with the outer capacity; a larger part of the leading current will pass through the inner capacities and accordingly the inner current will govern the distribution of the voltage over the insulator, respectively over the insulator chain.

In this manner it will be obtained that the inner capacities bring about the desired results in much more suitable fashion than it was possible with the outer rings heretofore used.

It is therefore possible to control the distribution of the voltage over the various parts of the insulator, as desired.

Thus it is possible to adjust the voltage across parts which are of relatively high strength while others which are not suited for very high stress can be arranged for low voltage drop.

In the case of Fig. 3 we have, for instance, supported by an arm 11 of the tower a chain consisting of 3 insulators; each insulator consists of an outer shell 21 of insulating material such as porcelain, glass, soap-stone or similar material.

Preferably the shell is provided with ribs 22 as well as with the bell shaped extension 23, in order to increase the creepage distance over the surface.

A metal shield 20 may be provided in order to protect the insulator against the influence of rain.

Such shields are fastened to the cover 24 of the insulator. The cover is separated from the insulator shell by a layer of resilient material 25. The cover is held to the insulator by means of hook-shaped bolts 26. The cover is provided with an ear 30 to receive the supporting member 32 of the next insulator of the chain.

The member 32 is provided with threads to be fastened to a bolt 34. The upper part of the bolt 34 has a disc 35—as shown—which rests on the bottom of the insulator shell 21. Between the disc 35 and the bottom of the insulating shell a resilient layer 36 is preferably provided. The lowest insulator carries on its member 32 a suitable ear 38 to support the line 40.

In order to obtain a suitable distribution of voltage between ground and line 40 condensers are arranged in the interior of the insulator.

The capacities may be so apportioned that the inner capacities of the various members of the chain are equal; but it is—of course—also possible that they can be made unequal in order to obtain any desired voltage distribution between the members of the chain. Again it is possible to distribute the capacities in the interior of the insulator either uniformly or unequally so as to obtain any desired voltage distribution along the insulator or the chain.

Referring now to Fig. 3, for instance, we have an arrangement, in which the capacity 50 of the upper member of the chain consists of a series of elements, two packets each marked 51 and 52 being connected in parallel. The middle insulator is provided with a capacity 53 consisting of a series of four elements each marked 54, 55, 56, 57 and the lower insulator is provided with a capacity 58 consisting of a series of six elements each marked 59, 60, 61, 62, 63, 64. The end plates of the condenser chain are preferably connected with metal parts, for instance through the connections 70 to the metal cover 24 or by the connections 71 to the metal plate 35.

The arrangement is not limited to the example shown, if desired, the gradation may be varied as desired. Generally, it will be preferable to hold the capacity greater near the high tension line rather than near the other end of the chain.

The gradations of the capacities may, for instance, be obtained by varying the sizes of the condensers, the thickness of the dielectric material or the number of layers connected in parallel; again it can be obtained through the proper grouping either in series or in parellel, or series parallel, of the various condenser elements.

Furthermore the condenser arrangements shown in the several figures may be used in any of the other figures and also any other condenser arrangement not described can be used.

Referring now to Fig. 4 we have an insulator chain which consists of somewhat differently constructed members. Each member has a core 110 of insulating material to which are cemented shells 111 and caps 24 and 240. The latter are attached to the conical shaped ends 241 and 242 of the core 110.

The hollow space between the core and the mantle 111 contains the condenser units which in this case are shown uniformly distributed in each member of the chain and alike in all.

Fig. 5 shows a further modification of my invention as applied to an insulator consisting of several parts; a shell 21 provided with bell shaped extension 23 and a metal ring 90 at the top, a metal cap 87 connected thereto by a metal membrane 91.

The lower end of the insulator is formed by a metal cap 120 with an ear 30, a rod 244 consisting of insulating material of high tensile strength, such as bakelized or otherwise impregnated paper or fibrous material adapted to carry the weight supported by the insulator. The condenser in this form is shown with spirally arranged layers 121 and 122, the single concentric elements being connected by suitable conducting rings 123.

Fig. 6 shows a further modification of an insulator with cemented caps 24 and 120. In the interior of the insulator a condenser 125 is shown, the number of parallel connected elements increasing in the direction from the top to the bottom.

By means of the various modifications of the invention shown in the drawings and a good many other possible modifications thereof, it is now possible to obtain every desired distribution of voltage between the parts of the insulator or the members of the insulator-chain such as, for instance, is indicated by line $E_b$ of Fig. 1 or any other curve.

The connections, for instance 140, 141, 142, 143, 144, 145 and 146 of Fig. 4, which serve for the connection of the adjoining condenser elements, at the same time determine the electrostatic field which is formed in the neighborhood of the condensers and also in the insulating core, insulating shell and especially also in the vicinity of the insulating shell.

Consequently any desired distribution of the electric voltage is possible, according to the arrangement of the condensers, and thereby also any desired stress distribution on the parts serving for the insulation. By means of aforesaid gradation and distribution of the electrostatic voltage, breakdowns of the insulator and its surroundings as well as inadmissibly high voltage drops, which lead to surface breakdowns, silent discharges, glow discharges or the like can be avoided.

It is possible to design in a chain the several members in such a way that uniform voltage drop over the members of the chain is obtained, so that all members of said chain are stressed uniformly. This is a great factor for the security of service. Furthermore, as a result of the uniform distribution of the stress across the several members of the insulator-chain the number of said members or the length of the chain may be decreased and thereby also the height of the towers.

A further advantage of the arrangement according to my invention consists in the fact, that the insulator equipped with impedances, especially condensers, will at the same time serve for the purpose of absorbing steep and harmful waves travelling along the line; thus the line is protected against overvoltages and travelling waves throughout its whole length by equally distributed protecting condensers without use of any special protecting devices.

Furthermore overvoltages and travelling waves cannot assume dangerous values, since the travelling waves lose their dangerous steep front, the amount of over voltages is limited.

I do not wish to limit myself to the exact forms of the invention as herein described or shown; to any one skilled in the art various modifications will suggest themselves which fall within the scope of my invention.

What I claim is:

1. In combination, a tension-load casing unit including a tubular dielectric side wall and a metal end cap of substantially cup-shape secured over one end of the tubular side wall and having an outer element constituting one element of a flexible connector, a multi-layer condenser in the casing, and an opposite-end connector including a transverse portion within the longitudinal and lateral limits of the corresponding end of said wall and a portion projecting outwardly therefrom and constituting an element of a flexible connector.

2. In combination, a tension-load casing unit including a tubular dielectric side wall and a metal end cap of substantially cup-shape secured over one end of the tubular side wall and having an outer element constituting one element of a ball-and-socket connector, a multi-layer condenser in the casing, and an opposite-end member including a transverse portion within the longitudinal and lateral limits of the corresponding end of said wall and an outwardly-projecting portion constituting an element of a ball-and-socket connector.

3. In combination, a tension-load casing including a substantially tubular dielectric side wall having an annular outer surface creepage flange, and a metal end wall of substantially less thickness than the side wall and of less diameter than said flange having an outer portion constituting one element of a flexible connector, and a multi-layer condenser in the casing.

In testimony whereof I have hereunto set my hand.

WOLDEMAR HUGO KNAPP.